United States Patent Office 3,451,757
Patented June 24, 1969

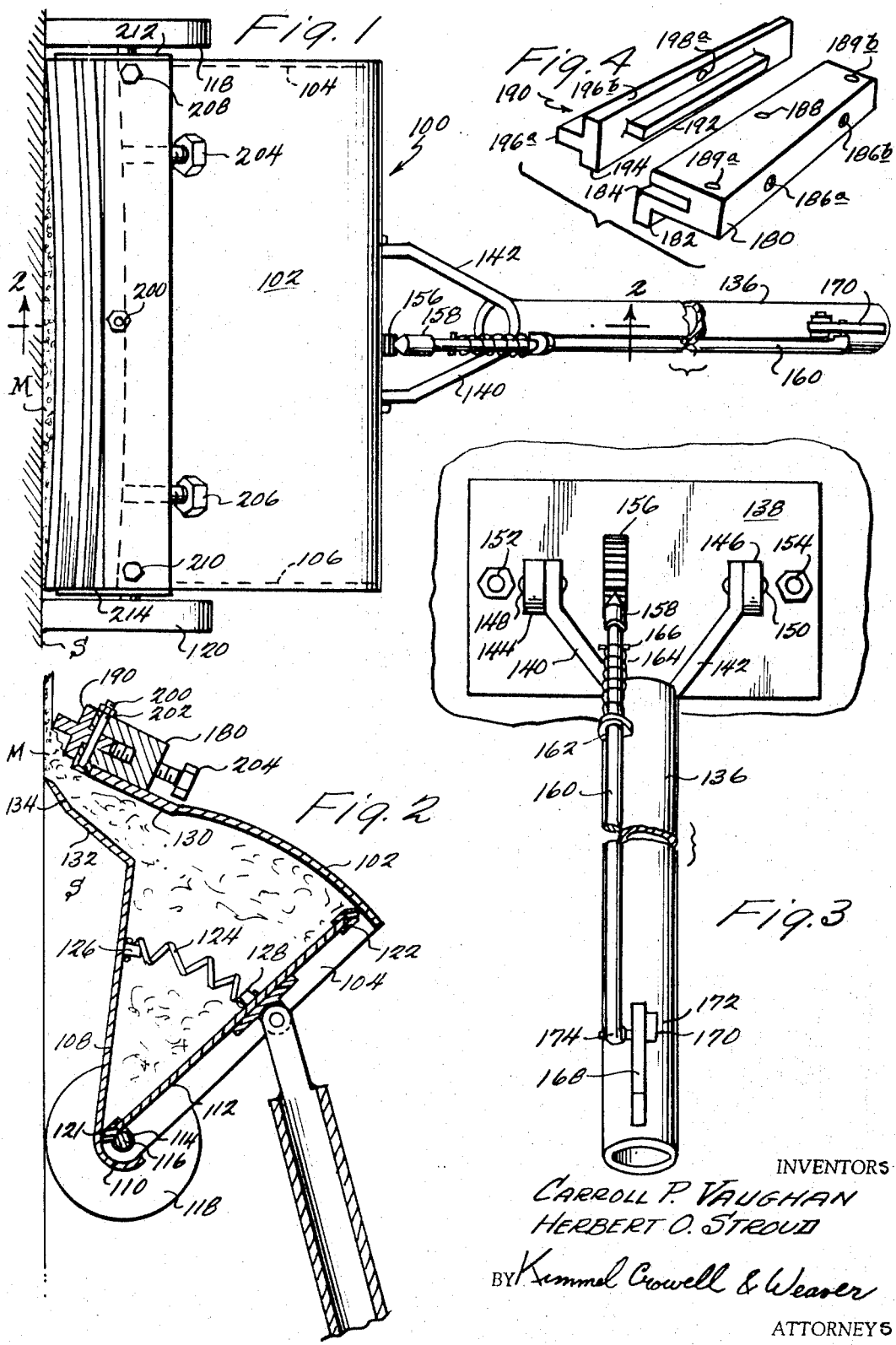

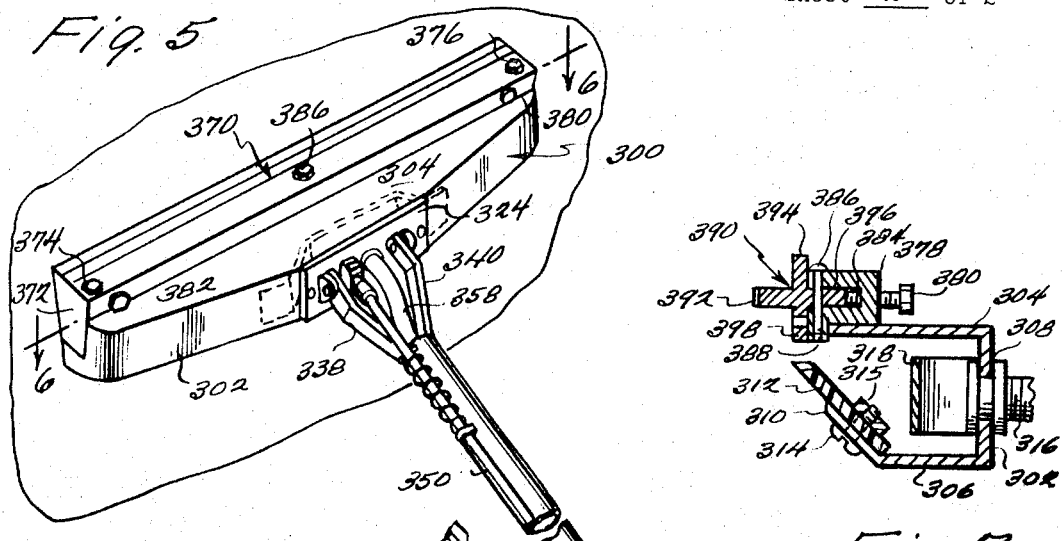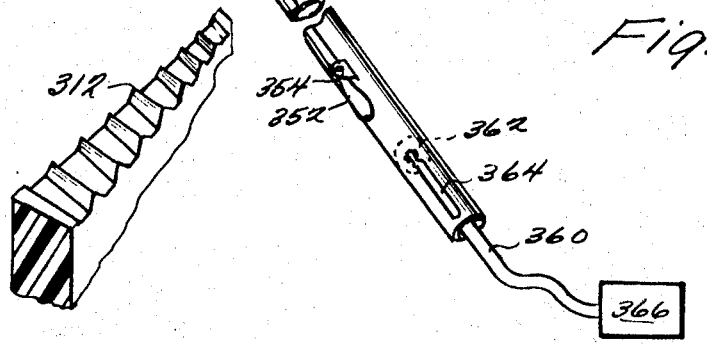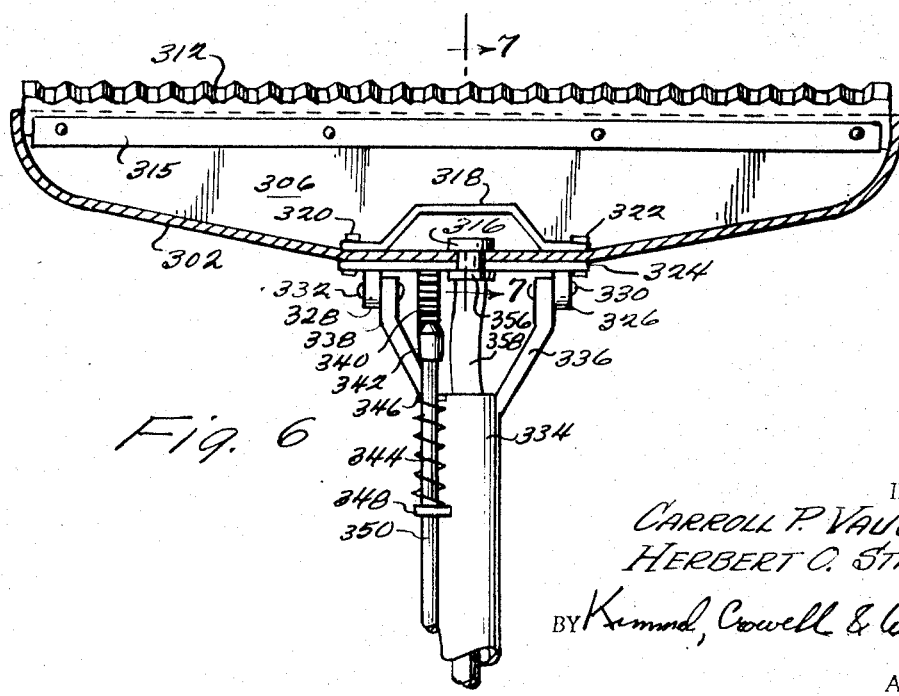

3,451,757
MECHANICAL FLOATING TOOL FOR MASTIC AND THE LIKE
Herbert O. Stroud and Carroll P. Vaughan, Canyon, Tex.; said Stroud assignor to B. O. Broome, Panola, and said Vaughan assignor of twenty-five percent to J. C. Richardson, Jr., and James F. Smith, Jr., Amarillo, Tex.
Filed Nov. 16, 1967, Ser. No. 683,567
Int. Cl. E04f 21/08
U.S. Cl. 401—139                                  2 Claims

ABSTRACT OF THE DISCLOSURE

A device for spreading semi-fluid mastic and like material which includes a dispensing chamber, means for forcing material from the dispensing chamber to a work surface and a spreader which includes an X-shaped blade member which is secured in a bracket at the center and which is resiliently deformed at the ends to feather the edges of the material being applied to the surface and a spreader blade which is grooved to provide even distribution of material on the surface are disclosed.

BACKGROUND OF THE INVENTION

Field of the invention

This invention relates to dispensing and spreading devices of the type which include a chamber for dispensing material to a work surface through a nozzle and a blade following the nozzle for spreading the material and for controlling the thickness of the material on the work surface.

Description of the prior art

Applicators for spreading mastic and other fluid or semi-fluid materials such as dry wall seam patching composition and the like are known in the prior art. Exemplary of the devices designed for this purpose are those shown in United States Patents Nos. 2,711,098, 2,809,513, 2,824,442, 2,889,699 and 3,103,033, issued to Ames and United States Patent No. 3,116,511 issued to Hoveland.

The common arrangement for such dispensers is to provide for some means of applying mastic or other semi-fluid material to a surface followed by a spreader arrangement which is often in the form of a blade or a brush to evenly distribute the material on the work surface. Two major difficulties have been sought to overcome by the prior art. First, there is the serious problem of providing a relatively even distribution of the material initially onto the work surface. The material must be dispensed onto the work surface in the proper quantity and the material must be reasonably well distributed on the work surface since if there is too much material the spreader will tend to accumulate the material and to leave clumps or globs of the material as it moves across the surface and if the material is not equally distributed there will be bare spots on the work surface and spots of excess material. It is, accordingly, a principal object of this invention to provide an improved device for spreading semi-fluid material which includes means for properly applying correct quantities of material to the work surface and a novel spreading mechanism for distributing material on a work surface and controlling the relative thickness of the material on the work surface such as, for example, feathering the edges of dry wall patching compound.

SUMMARY

The present invention contemplates a dispenser with a spreading mechanism secured to it for spreading material dispensed to a surface and for controlling the thickness of the material on that surface. In the preferred embodiment, the spreader mechanism comprises a cross-shaped blade member having two blade portions and two securing portions received in a bracket, the center of the blade member being secured relative to the bracket and the ends of the blade member being deformable relative to the bracket for variably controlling the thickness of the material across the length of the blade member. A novel distributing blade is provided in one embodiment of the invention for providing relatively even distribution of material to the work surface prior to spreading. It is, accordingly, an object of this invention to provide an improved spreading device.

A specific object of this invention is the provision of novel and advantageous means for spreading semi-fluid material on dry walls and the like and for controlling the thickness of the material on the walls variably across the length of the blade.

A further object of the invention is the provision of a novel spreading mechanism on a device for applying and spreading dry wall seam patching compound for feathering the edges of the compound during application.

Yet an additional and specific object of the invention is the provision of a novel distributing mechanism for applying semi-fluid material evenly on a surface.

The specific construction illustrated in the drawings and described in the specification constitutes an object of this invention and other objects will appear from the specification which follows and from the drawings to which reference is made.

BRIEF DESCRIPTION OF THE DRAWING

FIGURE 1 is a top plan view of the device of this invention looking downward showing the configuration of the invention during use.

FIGURE 2 is a side view in cross-sectional elevation showing the interior construction of the dispenser and the spreading mechanism of this invention, taken substantially along lines 2—2 of FIGURE 1 looking in the direction of the arrows.

FIGURE 3 is a rear view showing the handle configuration and the means for adjusting the angle of the handle relative to the dispensing portion of the invention.

FIGURE 4 is an exploded detail view showing the major elements of the spreading mechanism of this invention.

FIGURE 5 is a top plan view showing an alternative embodiment of the invention which includes automatic feed means and the novel distribution blade of this invention.

FIGURE 6 is a top view shown partially in cross section taken substantially along lines 6—6 in the direction of the arrows shown in FIGURE 5 illustrating the internal construction of the embodiment of FIGURE 5.

FIGURE 7 is an end cross-sectional view of the housing and spreader mechanism of the alternative embodiment of this invention taken substantially along lines 7—7 of FIGURE 6, looking in the direction of the arrows.

FIGURE 8 is a perspective view shown in partial cross-section of the distributing blade of this invention.

DESCRIPTION OF THE PREFERRED EMBODIMENTS

Reference is made to FIGURES 1 and 2 in particular and to FIGURES 3 and 4 for certain details which show a preferred embodiment of the present invention. The invention is of the type which includes a chamber for fluid or semi-fluid material. The chamber shown generally at 100 includes an upper arcuate wall 102, end walls 104 and 106, which are generally in the form of a sector of a circle, a fixed lower or front wall 108 which includes a bottom curved portion 110, best shown in FIGURE 2. A rear wall 112 is movably mounted to enclose the material confining chamber. The rear wall 112 is mounted by a ring or hinge arrangement 114 on an axle 116, which also mounts on the ends thereof a pair of wheels 118 and 120. Rubber scrapers 121 and 122 are received on the end of the movable wall 112 and rub, respectively, against the arcuate curved portion at the bottom 110 and the arcuate curved portion at the top 102 which forms the top wall. This completely encloses the material and prevents leakage. Similar scrapping means may be provided at the ends of the movable wall 112 if desired.

The movable wall 112 is biased away from the fixed wall 108, the fixed wall being fixedly secured along with the top wall 102 to the end walls, by a compression spring 124 which is held in place at one end by a pin 126 extending from the wall 108 and by the end 128 of a bolt which will be described hereinafter. A similar spring may be provided at the other end of the chamber if desired for symmetry.

The chamber also forms a nozzle by an extension 130 of the top wall, the extension 130 being generally flat and extending outwardly away from the arcuate portion 102. Another extension 132 defines the lower portion of the nozzle and the end walls are so formed and secured to the portions 130 and 132 as to enclose the ends of the nozzle. The nozzle, then, is in the configuration of an elongate slot through which the material may pass. The material M, best illustrated in FIGURE 2, passes through the slot and is applied to the surface S. A flexible blade-like member 134 is secured to the end of the nozzle member 132. The blade member 134 rides against the surface and prevents downward flow of the material.

Referring now to FIGURE 3 in particular and to FIGURE 1, a handle 136 which may be approximately four feet long is secured to the rear of the material confining chamber mechanism by a plate 138. The handle is secured by means of a Y-shaped configuration including legs 140 and 142 which are apertured at their end and a pair of brackets 144 and 146 secured to the plate 138 by means of pivot pins 148 and 150. The plate 138 is secured by a pair of bolts 152 and 154 to the movable wall 112, the heads of these bolts being utilized for fixing the ends of the compression springs, head 128 being the head of bolt 154.

In order to fix the angular relation of the handle with respect to the movable wall, a ratchet mechanism including a notched arcuate member 156 which is engaged by a dog 158 is provided. The dog 158 is carried on the end of a rod 160 which is supported by means such as a guide or a plurality of guides, illustrated at 162, along the length of the handle 136. The dog 158, and the rod 160, are biased inwardly into engagement with the ratchet 156 by a compression spring 164 which is received between the slide guide 162 and the keeper pin 166. A handle 168 is mounted by means of a bracket 170 and a pivot pin 172 proximate the distal end of the handle 136. An off center pivotal arrangement illustrated at 174 connects the handle 168 to the rod 160 such that the dog 158 may be moved into or out of engagement with the ratchet 156 merely by pivoting the handle 168 and reciprocably moving the rod 160. This type of construction is well known in the prior art and no detailed description is here deemed necessary.

A novel and most important feature of this invention is the spreading mechanism. Reference is made to FIGURE 4 which is an exploded view of the major components of the spreading mechanism. The spreading mechanism includes a bracket block 180 which includes a lip 182 extending downwardly therefrom and a slot 184 in the front surface thereof. The slot 184 extends a substantial distance rearwardly in the generally rectangular block portion of member 180. A pair of threaded apertures 186*a* and 186*b* are provided in the rear of the block and extend through to the slot 184. A vertically oriented aperture 188 extends downwardly through the block portion of 180 and through the lip 182, as best shown in FIGURE 2.

Referring still to FIGURE 4, a blade member which is an elongate cross-shaped member shown at 190 is provided which includes a pair of blade portions 192 and 194 adjacent each other and a pair of elongate retaining portions or securing portions 196*a* and 196*b*. Each of these retaining portions include a central aperture 198*a*. As illustrated in FIGURE 2, the apertures in the retaining portions are disposed for being in alignment with the aperture 188 such that a bolt or a pin 200 may extend and be secured in place by means of a nut or other keeper 202. A pair of bolts 204 and 206 are threadably received in the threaded apertures 186*a* and 186*b* and bear against the ends of the blade member 190.

Referring now to FIGURE 1, it will be seen that the blade element 190 is actually curved in use, in a desired configuration. The degree of curvature can be controlled by exerting a controllable force on the blade member 190 by means of the bolts 204 and 206. That is, since the center of the blade element 190 is secured relative to the bracket, the blade element may be curved outwardly from the center to either or both ends by adjusting the position of the threaded bolts 204 and 206 and, thereby, exerting an outward force on the ends of the blade member. Of course, the entire blade assembly is secured by means such as bolts 208 and 210 to the top of the dispensing mechanism and the ends are closed by closure elements 212 and 214. Such closure elements are desirable but are not actually necessary for certain uses.

In operation, the material is placed in the chamber and the dispenser is moved along the surface upon which the material is to be placed, the dispenser riding or floating on the wheels 118 and 120 and being supported by the flexible blade 134 so as to dispense a relatively constant flow of material to the surface. The blade 190, with a blade portion 192 or the blade portion 194, smooths the material and spreads it properly. More importantly, the blade element feathers the edges of the material. That is, it controls the thickness of the material along the length of the blade by means of the curvature of the blade which is the result of the force supplied through the bolts 204 and 206.

It will be apparent that while the blades of two lengths, for example six inches and eight inches or eight inches and ten inches, etc., may be provided on a single blade element, a plurality of the elements with any desired length of blade may be provided. The length of the blade, of course, depends upon the particular application. This dual length blade portion on the blade element has particular importance when the device is used for applying patching or plastering compound to dry walls. As is well known in the art, the first application of the compound is somewhat narrower than the second application, both applications being feathered at the edges.

The significance of being able to controllably deform the shape of the blade member so as to feather the edges is worthy of emphasis. Other efforts have been made to provide for automatic feathering but, in general, they use blades which are too flexible and which do not give adequate control of the thickness.

Reference is made now to FIGURES 5 through 8 and, in particular, to FIGURES 5 and 6 for an alternative embodiment of the invention wherein the material is automatically supplied from a reservoir.

A housing 300 which includes a rear wall 302 which is curved, a top wall 304 and a bottom wall 306 and which has a generally open front is provided. The rear wall 302 includes an aperture 308 therethrough, the function of which will be described hereinafter. The front portion of the housing may be partially closed by a securing element or member 310 which in one form of the invention is a lip extending partially across the opening. A distributing blade, the configuration of which is very important, 312 is secured by means of a plurality of bolts 314 and, if desired, a retaining bar 315 to the lip 310. The distributing blade 312, as best illustrated in FIGURE 7, extends outwardly in front of the housing. This blade, like blade 134 of the first embodiment, rests against the surface during application. An inlet tube 316 which may include an internal flange for retaining inside the housing extends through the aperture 308 for providing material into the housing. A diffusing member 318, secured by bolts 320 and 322 to the housing, distributes the material throughout the housing and prevents the material from flowing directly from the inlet aperture to the dispensing area of the housing.

A plate 324 is mounted, also by bolts 320 and 322, to the rear of the housing and carries thereon a pair of apertured bracket members 326 and 328 through which extend pins 330 and 332 for securing a handle 334 thereto by means of legs 336 and 338 on the ends of the handle. Thus the handle is pivotally secured to the plate 324.

An arcuate ratchet member which is notched, shown at 340, is also secured to the plate 324 and is engaged by a dog 342, the dog being held into engagement normally by means of a spring 344 which is held between a keeper 346 and a bracket 348 through which a rod 350 slidably extends. The rod 350 is secured to an operating handle 352 by means of a bracket 354 in an eccentric fashion such that when the handle is operated the rod reciprocates to move the dog 342 into engagement or out of engagement with the ratchet 340.

Referring to FIGURE 6, the inlet tube 316 is secured in place through an aperture 308 in the housing and an aperture in the plate 324 by means of a washer or nut 356. A flexible tube or conduit 358 is secured to the inlet tube 316 and extends through the handle to a valve 362 which is operated by a valve handle 364. A second flexible tube 360 extends out of the end of the handle and to a pressurized source of material shown generally at 366. The configuration of the valve and the source of supply do not constitute a significant feature of this invention and are conventional of types shown in the prior art.

The spreader mechanism of this device is shown generally at 370 in FIGURE 5 and is secured in place by a pair of bolts 372 and 374 and includes end plates 372 and another end plate not shown.

The interior construction of the spreading mechanism is shown in greater detail in FIGURE 7. A generally rectangular block 378 is provided with apertures for threadably receiving a pair of bolts 380 and 382 proximate the ends thereof, the bolts extending into a slot in the forward edge of the block 378, the slot being shown in 384. A pin 386 extends through a vertically aligned aperture into a lip portion 388. The pin serves to secure a blade member 390 in the slot. The blade member includes a pair of blades adjacently located shown at 392 and 394 and a pair of securing extensions 396 and 398, the pin 386 extending through an aperture in the securing portion 396 in the configuration shown in FIGURE 7.

In operation, the bolts 380 and 382 are tightened to cause the blade member 390 to curve the desired degree. The center of the blade member 390 is, of course, held fixed relative to the bracket 378 thus permitting the blade to be curved.

The material is caused to flow from the source 366 which may be a reservoir with a pump thereon through the conduit 360 under the control of the valve 362 and into the housing where it is diffused by the diffusing member 318. The material is then applied to the surface as it flows out over the flexible distributing blade 312. It will be noted from FIGURES 6, 7 and 8 that the distributing blade 312 is beveled and notched so that the material flows evenly and smoothly outwardly onto the surface.

It is also important to note that by adjusting the screws 314 the flexibility of the blade 312, in its holder, may be controlled to apply more or less material as is desired.

As the material is dispensed, it is spread by means of the blade member 390 and the edges of the material may be feathered simply by providing the proper curvature to the blade member 390 utilizing the bolts 380 and 382 to curve the blade.

It is contemplated that the housing in both embodiments of the invention be made of a strong sheet metal such as aluminum or stainless steel. Plastic materials or the like could also be used but for structural strength and durability, a tough metal is preferred.

The brackets 180 and 378 and the blade members 190 and 390 may be made of either metal or plastics. The bracket may be made of metal and the blade may be made of plastic in a desired configuration. Thus, it may be desirable to make the bracket of stainless steel or brass or aluminum and to make the blade of nylon or polypropylene. Similarly, both the bracket and the blade may be made of nylon or some other plastic.

The distributing blade 312 is preferably made of nylon also. It will be understood, however, that other plastic materials may be used and that flexible metals such as a stainless steel blade may also be used. However, for the desired durability and flexibility a nylon or similar material is preferred. It is not contemplated, however, that the scope of the invention be limited to any particular materials or groups of materials.

From the foregoing it will be seen that by utilization of the devices of this invention it is possible both to apply and to spread fluid material, such as dry wall compound, to a surface and to spread the material and to feather the edges of the material on the surface in one single operation. The savings of time to artisans in this field will be apparent to those skilled in the art.

While the invention has been described with reference to specific constructions and embodiments, it will be understood that departures from the actual constructions illustrated may be made without departing from the spirit of the invention and from the scope of the invention as defined in the following claims.

We claim:
1. In a device for spreading semi-fluid material, such as mastic and dry wall seam patching compound, of the type which, in combination, comprises a dispenser for applying material to a work surface and a spreader secured to the dispenser for spreading the material on the work surface and controlling the thickness of the material, the improvement wherein the spreader comprises:

an elongate bracket block secured to said dispenser, said bracket block having a longitudinal slot opening into the front surface thereof and extending from one end of said block to the other end thereof, said block having a pair of threaded apertures opening through the rear surface thereof and communicating with the opposite end portions of said slot, said block having a bore extending therethrough intermediate the opposite ends thereof and extending from the upper surface to the lower surface of said block communicating with said slot;

an elongate blade member made of material which is sufficiently rigid to normally retain a predetermined shape and sufficiently flexible to be resiliently deformed under externally applied force, said blade having a cross-shaped transverse cross section which includes a pair of right angularly related retaining portions with each retaining portion having a work contacting blade portion extending in the same plane therewith, one of said blade portions being substantially shorter than the other of said blade portions, said retaining portions being selectively seated in said slot in said bracket block;

a bolt extending through said bore in said bracket block and through a bore in the center of one of said retaining portions to secure said blade member to said bracket block; and a pair of bolts threaded through the threaded apertures in said bracket block and engaging against the opposite ends of the retaining portion seated in said slot, said bolts being adapted to adjustably force the opposite end portions of said blade member outwardly of said slot to concavely curve the blade portion opposite the retaining portion seated in said slot for feathering the edges of the material on the surface during spreading.

2. A device as claimed in claim 1 wherein one of said blade portions is notched along the work engaging edge thereof.

References Cited

UNITED STATES PATENTS

| | | | |
|---|---|---|---|
| 2,571,096 | 10/1951 | Ames | 401—263 |
| 2,711,098 | 6/1955 | Ames | 401—171 X |
| 2,824,442 | 2/1958 | Ames | 401—171 X |
| 2,882,716 | 4/1959 | Anderson | 401—139 |
| 2,982,987 | 5/1961 | Knapp | 401—139 |

FOREIGN PATENTS 244,585  5/1963  Australia.

LAWRENCE CHARLES, *Primary Examiner.*

U.S. Cl. X.R.

401—171